(12) United States Patent
Chou (10) Patent No.: US 8,978,716 B2
(45) Date of Patent: Mar. 17, 2015

(54) VEHICLE-CARRIED AIR COMPRESSION DEVICE

(76) Inventor: Wen-San Chou, Tainan (TW)

( * ) Notice: Subject to any disclaimer, the term of this patent is extended or adjusted under 35 U.S.C. 154(b) by 634 days.

(21) Appl. No.: 13/336,091

(22) Filed: Dec. 23, 2011

(65) Prior Publication Data

US 2013/0105055 A1 May 2, 2013

(30) Foreign Application Priority Data

Nov. 2, 2011 (TW) .............................. 100139942 A (51) Int. Cl.
*B65B 31/00* (2006.01)
*B60S 5/04* (2006.01)
*B29C 73/16* (2006.01)

(52) U.S. Cl.
CPC ............... *B60S 5/043* (2013.01); *B29C 73/166* (2013.01)
USPC ............... 141/38; 141/353; 137/231; 137/511

(58) Field of Classification Search
CPC ....... B60S 5/043; B60C 29/062; B60C 29/00; F16K 15/20
USPC ............. 141/38, 351–354; 137/223, 231, 511
See application file for complete search history.

(56) References Cited

U.S. PATENT DOCUMENTS

| 5,819,781 | A  | * | 10/1998 | Wu ................................ 137/231 |
| 6,964,284 | B2 | * | 11/2005 | Eckhardt ......................... 141/38 |
| 8,336,581 | B2 | * | 12/2012 | Lolli et al. ...................... 141/38 |
| 8,631,840 | B2 | * | 1/2014  | Lolli et al. ...................... 141/302 |
| 8,746,292 | B2 | * | 6/2014  | Lolli et al. ....................... 141/38 |
| 2008/0190489 | A1 | * | 8/2008 | Wrubel et al. ................. 137/231 |

* cited by examiner

*Primary Examiner* — Jason K Niesz
(74) *Attorney, Agent, or Firm* — Alan D. Kamrath; Kamrath IP Lawfirm, P.A.

(57) ABSTRACT

A vehicle-carried air compression device includes a case installed with an air compressor therein, a tire repairing container containing a liquid adhesive, and a flexible linking tube. An air inlet coupler of the tire repairing container is connected with an air outlet manifold of the air compressor. An end of the flexible linking tube is coupled to an adhesive outlet coupler of the tire repairing container, and the other end of the flexible linking tube is combined with a protection adapter for coupling to a tire nipple. Before the protection adapter is connected with the tire nipple, the other end of the flexible linking tube is closed by the protection adapter, so that the liquid adhesive in the tire repairing container will not shoot out suddenly because of improper handling.

9 Claims, 10 Drawing Sheets

VEHICLE-CARRIED AIR COMPRESSION DEVICE

BACKGROUND OF THE INVENTION

1. Field of the Invention

The present invention relates to an air compression device and, more particularly, to a vehicle-carried air compression device which can mend or seal damaged tires with an adhesive or a puncture-sealing agent and inflate them.

2. Description of the Related Art

A conventional air compressing apparatus for repairing and inflating damaged tires includes a case installed with an air compressor therein and a tire repairing container containing a liquid adhesive or puncture-sealing agent. An air inlet coupler and an adhesive outlet coupler are disposed on the tire repairing container. A conduit is connected between the air inlet coupler and an air outlet manifold of the air compressor. The adhesive outlet coupler is connected to an end of a flexible linking tube, and the other end of the flexible linking tube is adapted to be connected to an air nipple of a damaged tire. When the flexible linking tube is connected to the air nipple of the tire, and when the case is started by DC power of an automobile, pressurized air will be generated by the air compressor to force the liquid adhesive in the tire repairing container to flow out and enter into the tire through the flexible linking tube, so that a process of sealing and inflating is completed. However, during the process of mending or sealing with the liquid adhesive, and if a power source is connected under conditions that a user did not notice a power switch status of the case is ON (the power switch of the case may be switched to ON status) and the user has not connected the flexible linking tube to the air nipple of the tire, the liquid adhesive in the tire repairing container will shoot out suddenly from the other end of the flexible linking tube, and the user or other articles will get contaminated.

BRIEF SUMMARY OF THE INVENTION

Thus, an objective of the present invention is to provide a vehicle-carried air compression device to improve the aforementioned problems. The air compression device of the present invention can be used for rescue works of air inflation and tire sealing, and a liquid adhesive in a tire repairing container will not shoot out suddenly because of improper handling.

To achieve this and other objectives, a vehicle-carried air compression device of the present invention includes a case having an air compressor therein, a tire repairing container containing a liquid adhesive for sealing automobile tires, and a flexible linking tube including a first end combined with a connector and a second end provided with a protection adapter. The tire repairing container includes an adhesive outlet coupler and an air inlet coupler connected with the air compressor. The connector is coupled to the adhesive outlet coupler of the tire repairing container. The protection adapter is adapted to be connected with an air nipple of a tire and includes an outer cover, a base, a buffer ring, a valve cock, and a spring. The outer cover has an axial hole extending through the outer cover and including a first end having an opening and a second end having a coupling portion for connecting with the air nipple of the tire. A shoulder is formed on an inner end surface of the coupling portion. The base includes a connecting section and a cylindrical section with a cylindrical chamber therein. The cylindrical section of the base is received in the axial hole of the outer cover from the opening, and the connecting section is protruded outside of the opening of the outer cover. A passage is formed in the connecting section and in communication with the cylindrical chamber. The buffer ring is mounted in the cylindrical section of the base and has a through-hole extending through the buffer ring. A flange is formed on an end of the buffer ring and pressed against the shoulder of the outer cover. The valve cock is received in the cylindrical chamber of the base and includes a pole body extending through the through-hole of the buffer ring and a head extending outwardly from an end of the pole body. The spring is sleeved around an outer circumference of the head of the valve cock and received in the cylindrical chamber of the base. The spring biases the valve cock towards the buffer ring to close the through-hole of the buffer ring. When the air nipple of the tire is engaged with the coupling portion of the outer cover, the air nipple is in contact with the valve cock and moves the valve cock away from the buffer ring, so that the spring is compressed to open the through-hole of the buffer ring. Before the tire nipple is connected with the protection adapter of the flexible linking tube, the flexible linking tube is closed by the protection adapter, so that the liquid adhesive in the tire repairing container will not shoot out suddenly because of improper handling.

In a preferred form, the case includes a coupling indentation therein. The air compressor includes an air outlet manifold. The tire repairing container includes a lid covering an opening formed in the tire repairing container, and the air inlet coupler and the adhesive outlet coupler are provided on the lid. The tire repairing container is engaged to the coupling indentation of the case with the opening pointing downward. The air inlet coupler is connected to the air outlet manifold of the air compressor.

In a preferred form, a plurality of spaced protruded ribs is arranged on a circumference wall of the cylindrical chamber. An inclined tapering wall is formed on a bottom of the cylindrical chamber, and each of the protruded ribs is extended inwardly to one of the platforms of the inclined tapering wall. A depressed flowing trough is formed between two of the platforms. adjacent to each other, and an arcuate supporting surface is formed on an inner side of each platform. The head of the valve cock is pressed against the supporting surface of the base when the air nipple moves the valve cock away from the buffer ring.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

DETAILED DESCRIPTION OF THE INVENTION

Figure 1:
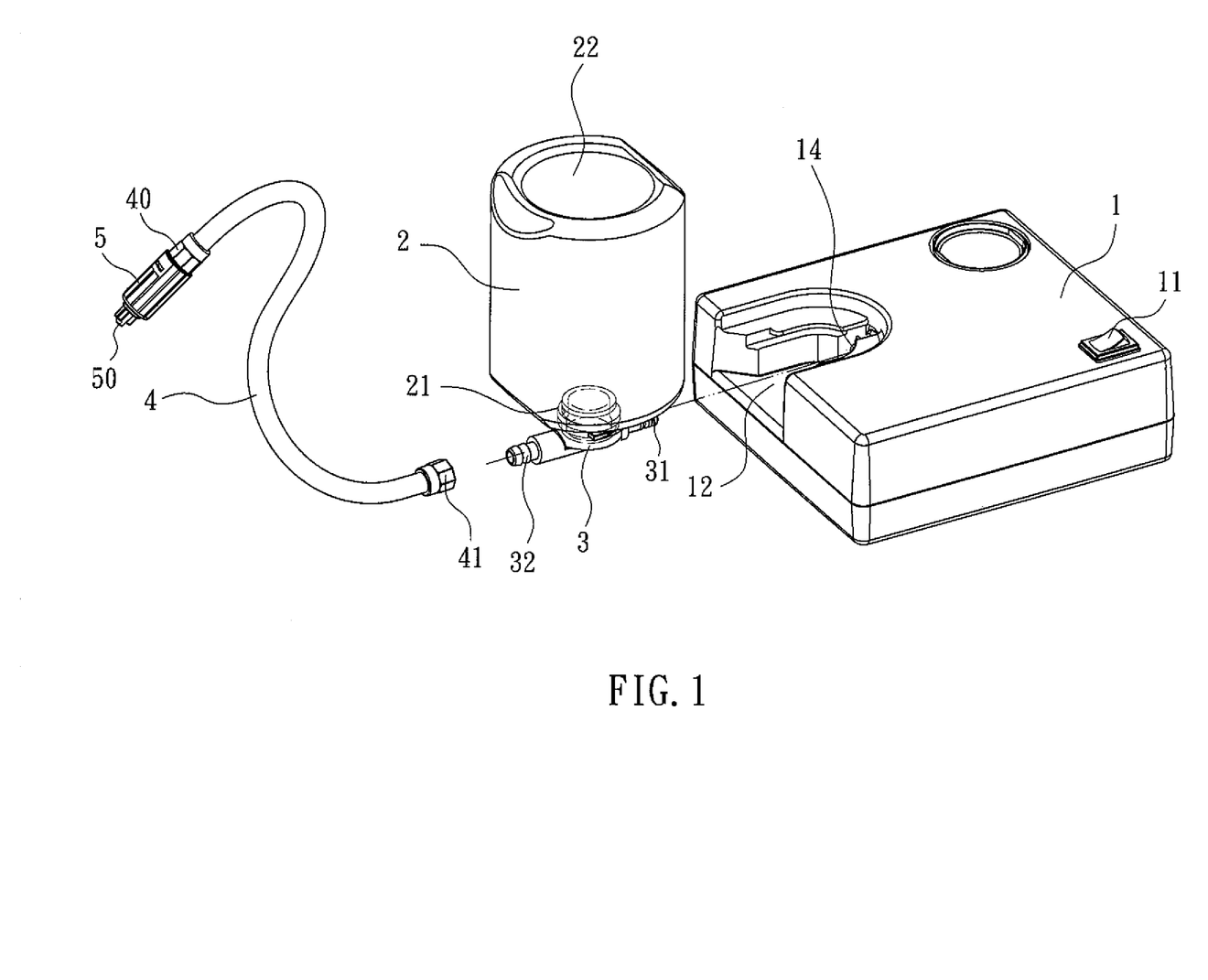
FIG. 1 is an exploded, perspective view of a vehicle-carried air compression device of the present invention.
Figure 2:
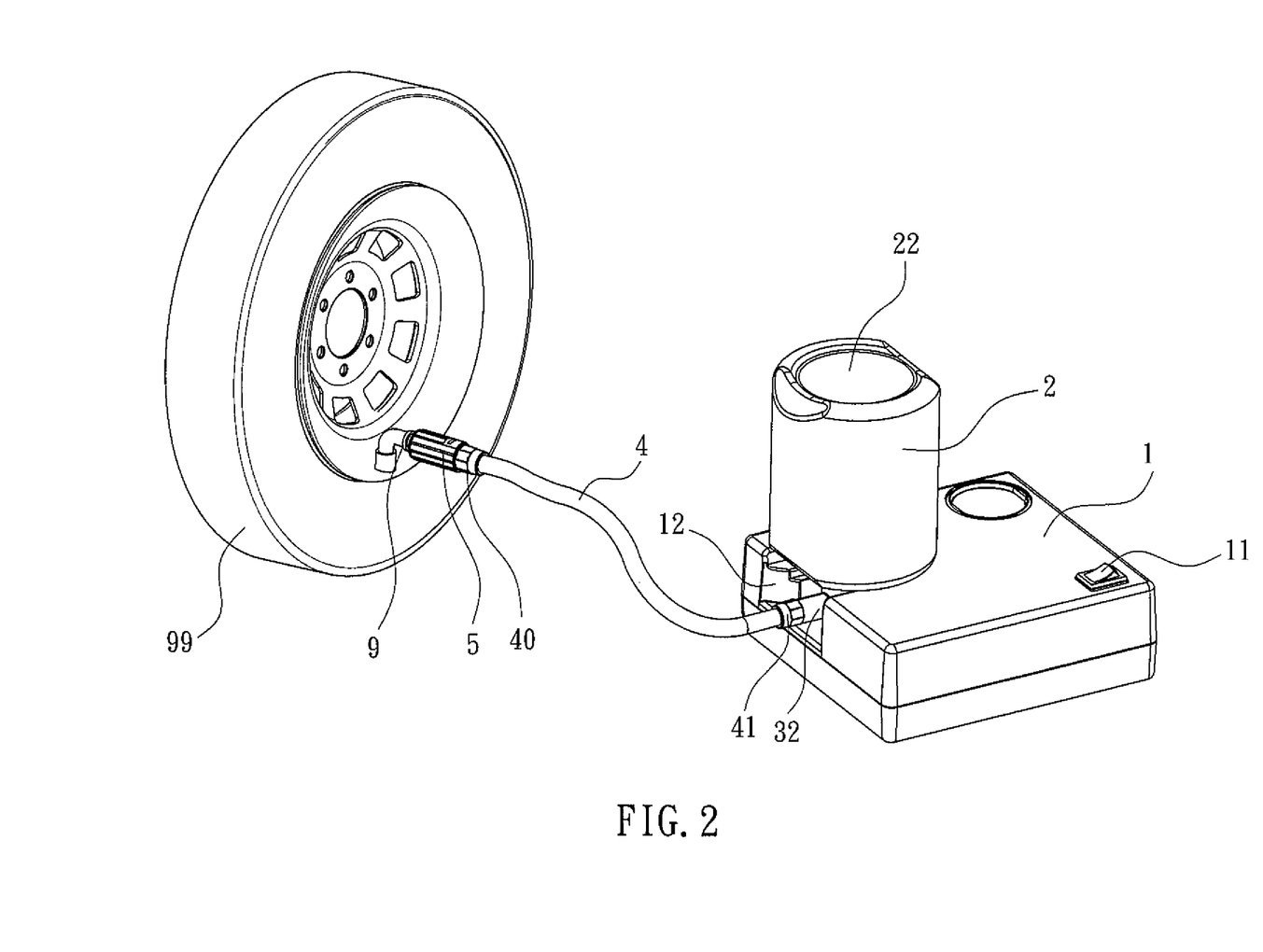
FIG. 2 is an illustration of the air compression device of FIG. 1 being applied in sealing and pumping an automobile tire.
Figure 3:
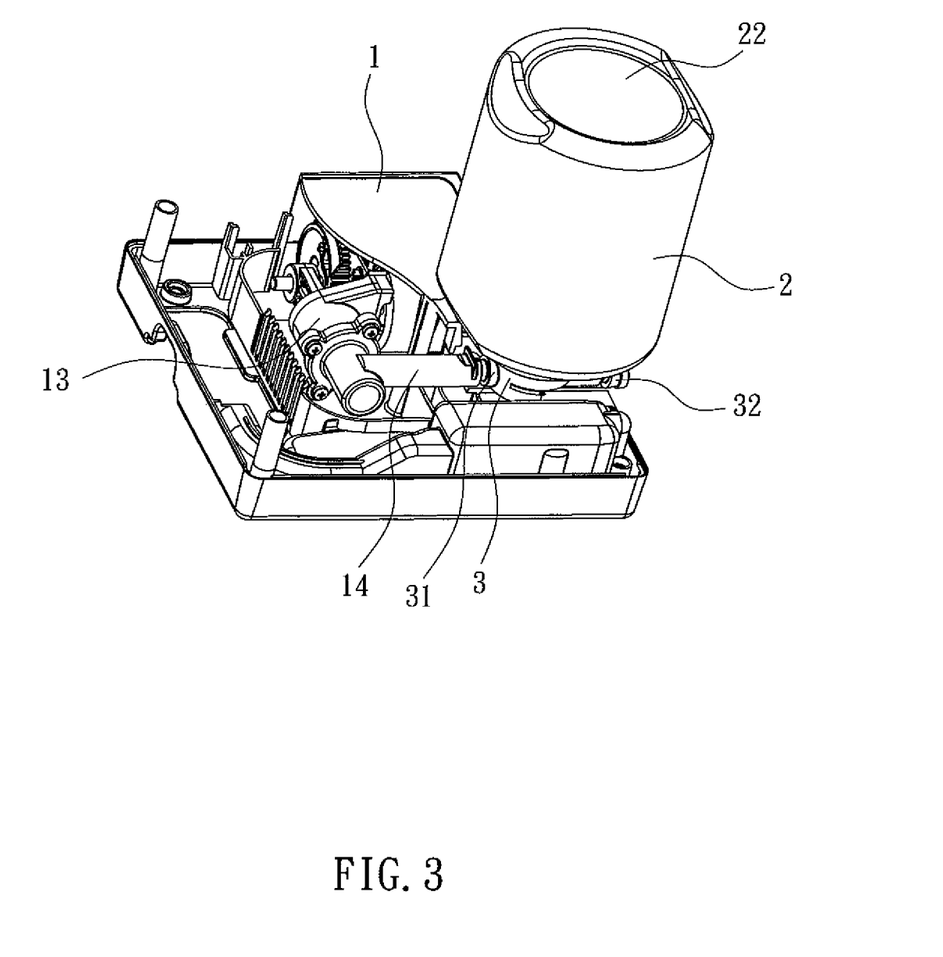
FIG. 3 is a partial, sectioned view of the air compression device of FIG. 1.

FIG. 1 shows an air compression device of the present invention applicable to be carried in an automobile to perform rescue works of repair and inflation for a damaged tire 99 (see FIG. 2). The air compression device includes a case 1, a tire repairing container 2, and a flexible linking tube 4.

Referring to FIGS. 1 to 10, the case 1 includes a switch 11 thereon and a coupling indentation 12 therein. An air compressor 13 is installed inside the case 1 and includes an air outlet manifold 14 having an end in the coupling indentation 12. The tire repairing container 2 has an opening 21 disposed at a side opposite to a bottom wall 22 of the tire repairing container 2 and screwed together with a lid 3. An air inlet coupler 31 and an adhesive outlet coupler 32 are provided on the lid 3. The tire repairing container 2 is engaged to the coupling indentation 12 of the case 1 with the opening 21 pointing downward and with the air inlet coupler 31 of the lid 3 connected to the air outlet manifold 14 of the air compressor 13. A first end of the flexible linking tube 4 is combined with a connector 41 which is coupled to the adhesive outlet coupler 32 of the lid 3, and a second end of the flexible linking tube 4 is provided with a protection adapter 5. When the tire 99 needs to be sealed and inflated with air, the protection adapter 5 of the flexible linking tube 4 is connected with an air nipple 9 of the tire 99, and the case 1 is started by DC power of an automobile or other DC power sources, so that pressurized air is generated by the air compressor 13 to force the liquid adhesive in the tire repairing container 2 to flow out, and enter into the tire 99 through the flexible linking tube 4. Thus, a process of sealing and inflating is completed.

Figure 4:
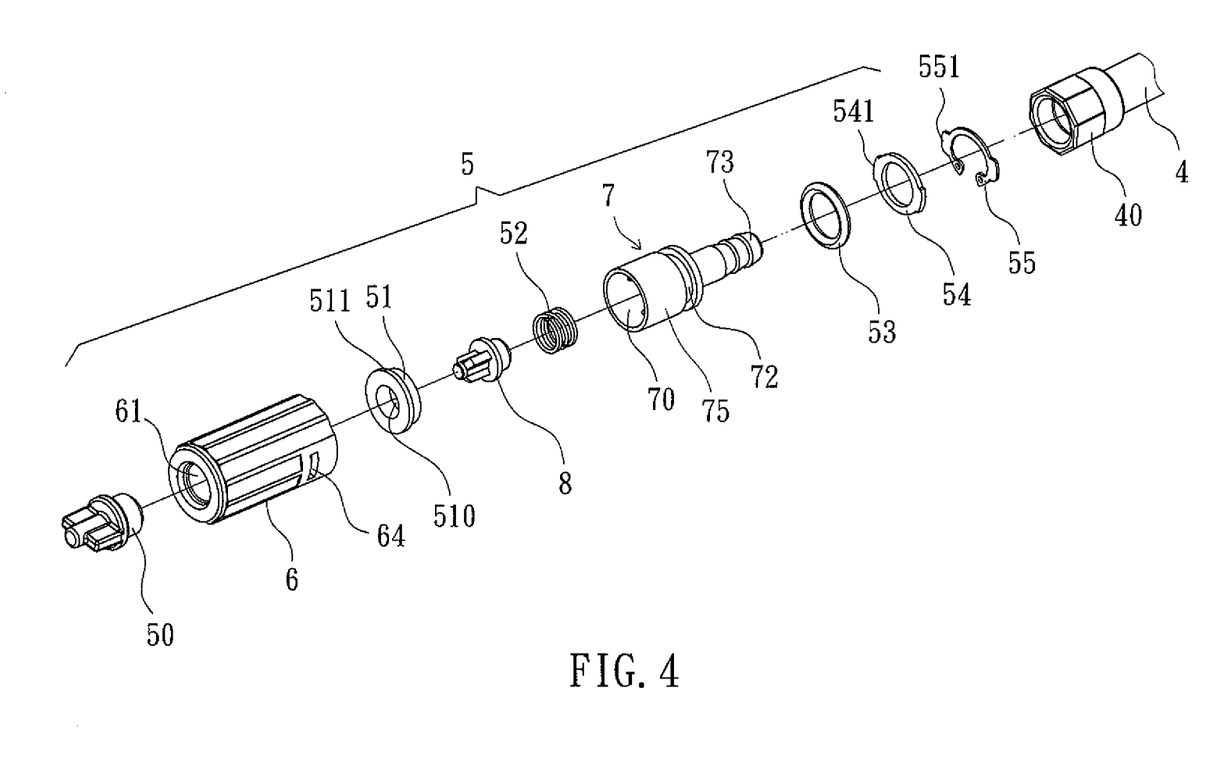
FIG. 4 is an exploded, perspective view of a protection adapter of the air compression device of FIG. 1.
Figure 5:
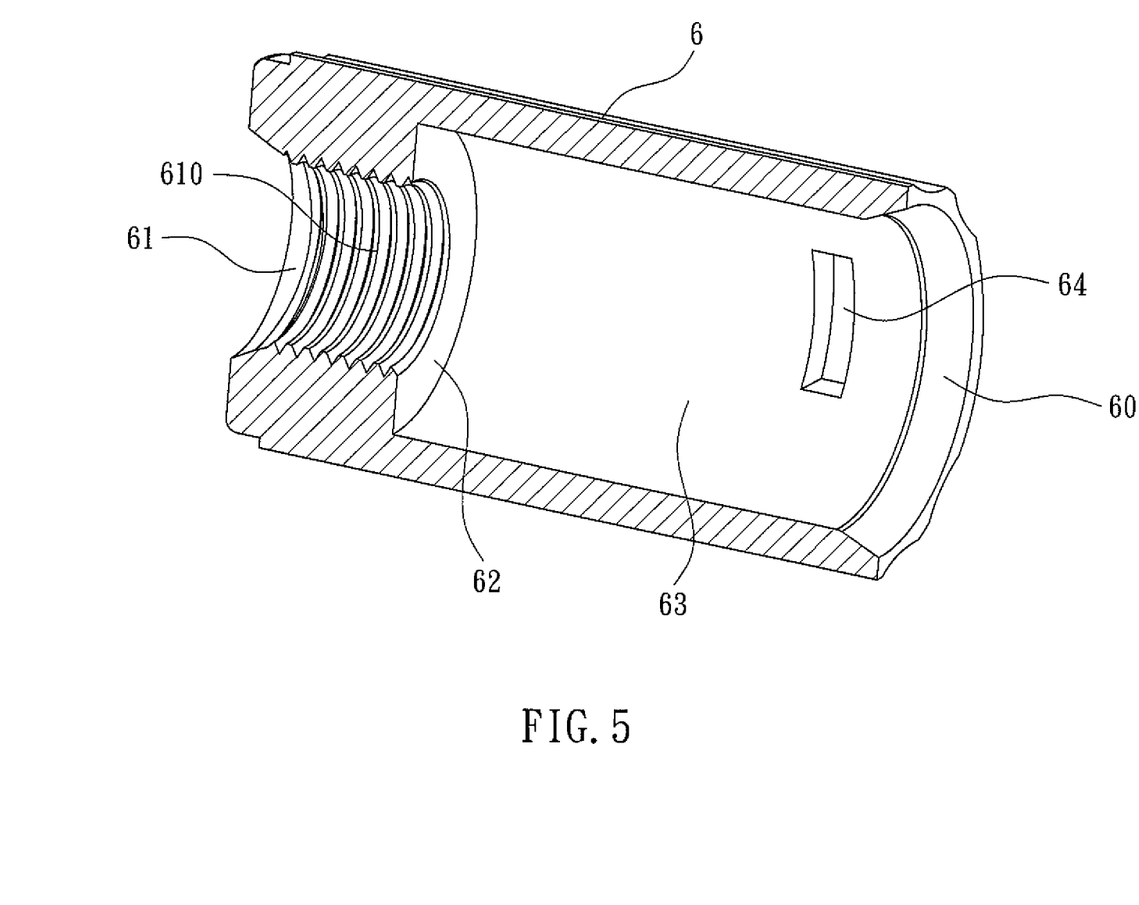
FIG. 5 is a sectioned view of a cylindrical outer cover of the protection adapter of FIG. 4.

A main characteristic of the vehicle-carried air compression device of the present invention is the protection adapter 5 of the flexible linking tube 4. The protection adapter 5 includes a cylindrical outer cover 6, a cylindrical base 7, a buffer ring 51, and a valve cock 8. An axial hole 63 extends through the outer cover 6 along an axis and includes a first end having an opening 60 and a second end having a coupling portion 61 with a smaller hole diameter. Two slit openings 64 are formed oppositely in the outer cover 6 adjacent to the opening 60, a female thread 610 is formed on an inner wall of the coupling portion 61, and a shoulder 62 is formed on an inner end surface of the coupling portion 61 (see FIG. 5).

Figure 6:
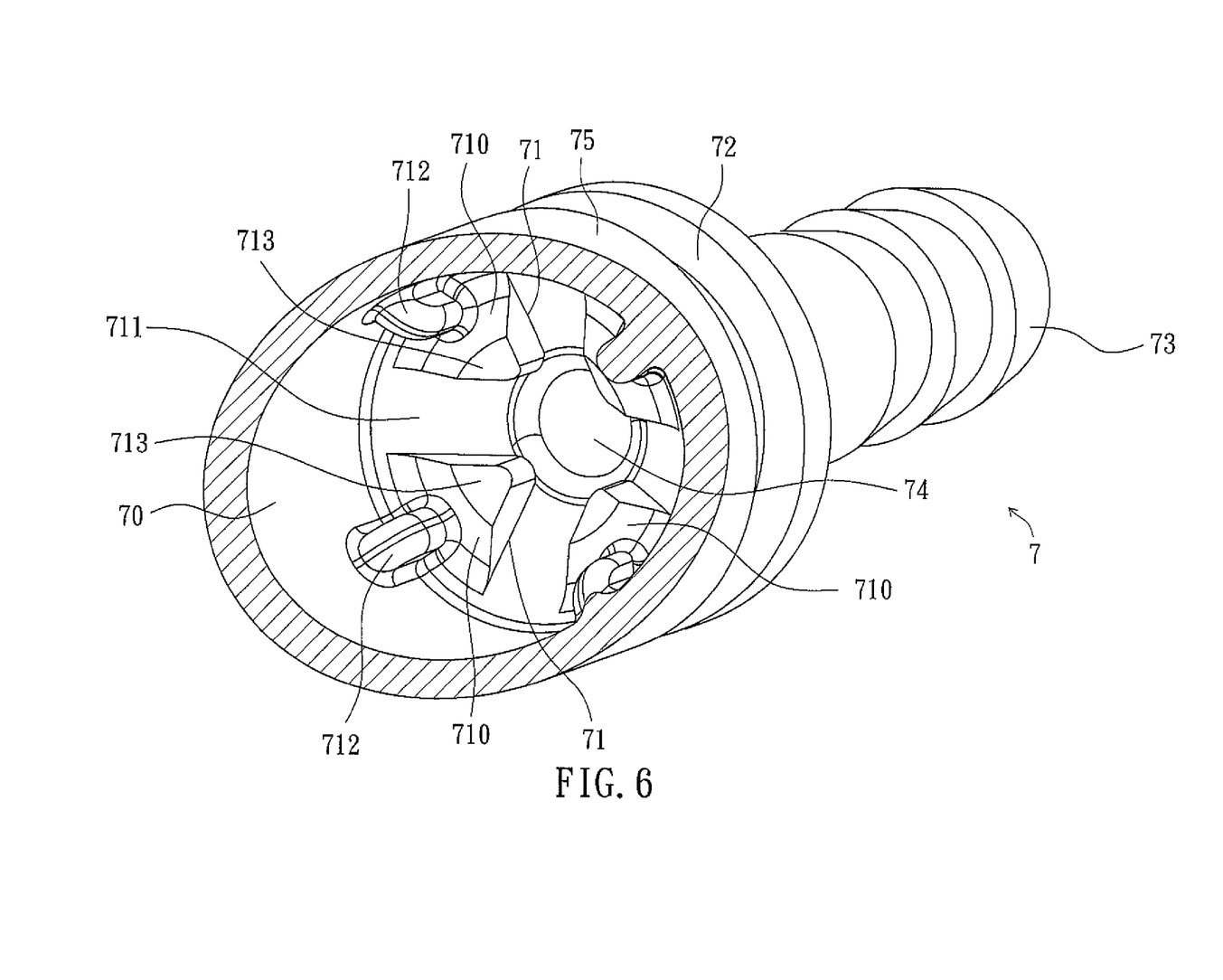
FIG. 6 is a partial, sectioned view of a base of the protection adapter of FIG. 4.
Figure 7:
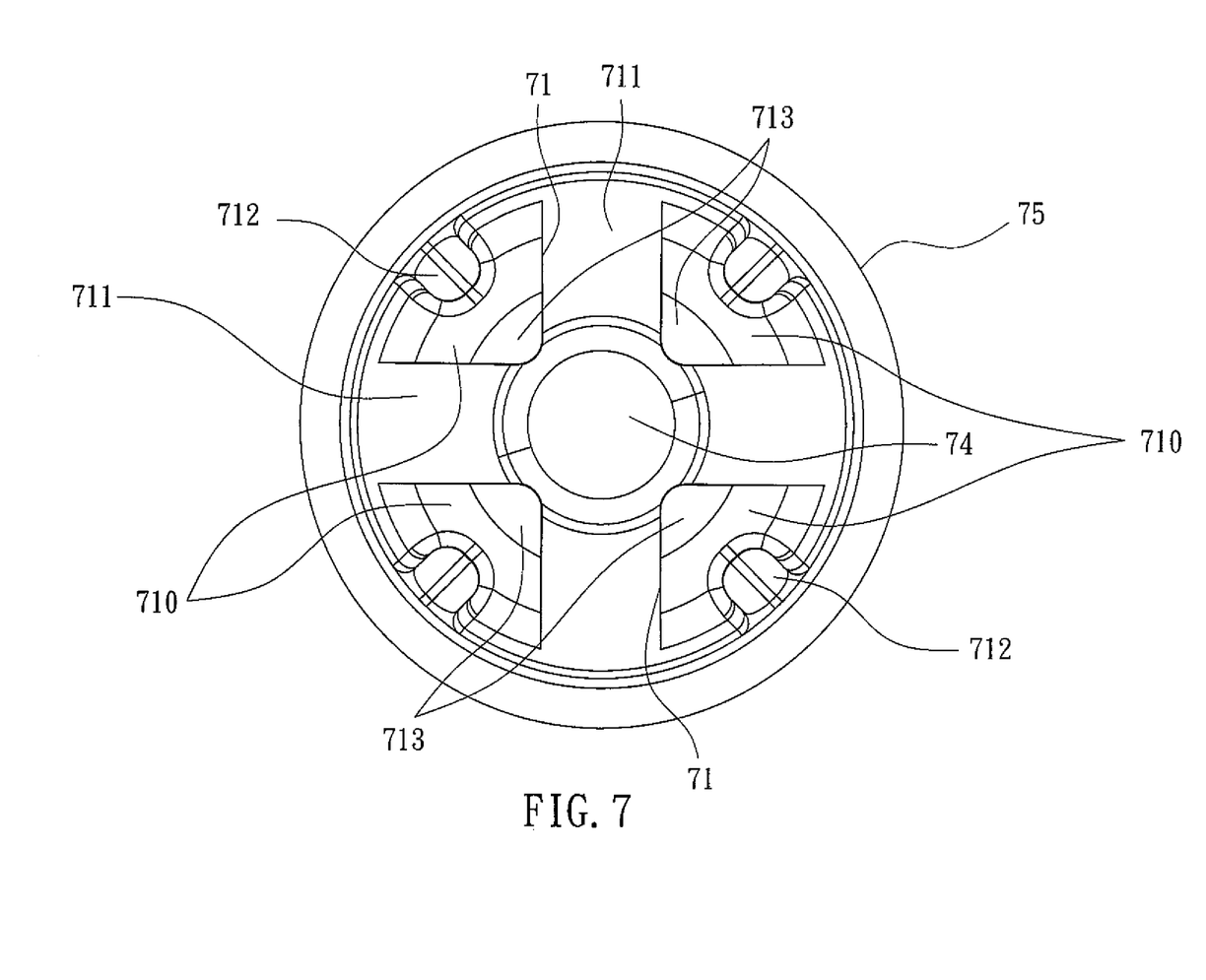
FIG. 7 is a side view of the base of the protection adapter of FIG. 4.
Figure 8:
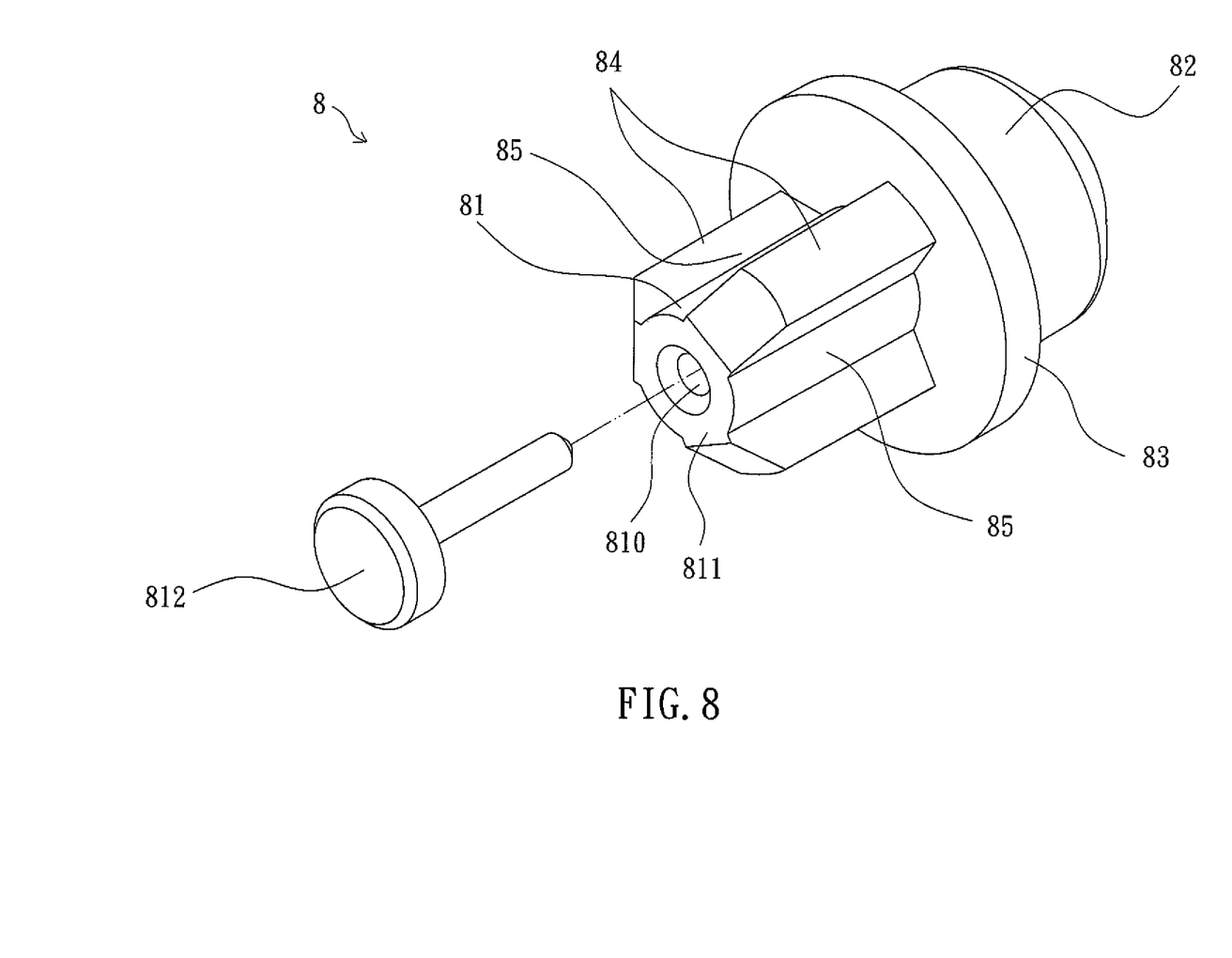
FIG. 8 is an enlarged, exploded view of a valve cock of the protection adapter of FIG. 4.

The base 7 includes a connecting section 73 and a cylindrical section 75 with a cylindrical chamber 70 therein. The cylindrical section 75 of the base 7 is received in the axial hole 63 of the outer cover 6 from the opening 60, and the connecting section 73 is protruded outside of the opening 60 of the outer cover 6. A plurality of spaced protruded ribs 712 is arranged on a circumference wall of the cylindrical chamber 70. An inclined tapering wall 71 is formed on a bottom of the cylindrical chamber 70 and includes a plurality of platforms 710. Each of the protruded ribs 712 is extended inwardly to one platform 710 of the inclined tapering wall 71 (see FIG. 9). A depressed flowing trough 711 is formed between two adjacent platforms 710, and an arcuate supporting surface 713 is formed on an inner side of each platform 710. Furthermore, a passage 74 is formed in the connecting section 73 and in communication with the cylindrical chamber 70, an annular groove 72 is formed in an outer wall of the cylindrical section 75 of the base 7, and a sealing ring 53 is disposed in the annular groove 72.

A through-hole 510 is extended through a center of the buffer ring 51 along the axis, and a flange 511 is formed on an end of the buffer ring 51. The buffer ring 51 is mounted in the cylindrical chamber 70 of the base 7 with the flange 511 pressed against the shoulder 62 of the outer cover 6 and located between an outer end face of the cylindrical section 75 and the shoulder 62 of the outer cover 6.

The valve cock 8 is made of a plastic material and is received in the cylindrical chamber 70 of the base 7. The valve cock 8 includes a pole body 81, a head 82 extended outwardly from an end of the pole body 81, and a protruded wall 83 formed between the pole body 81 and the head 82 (see FIG. 8). A plurality of spaced protruded ribs 84 is formed circumferentially on the pole body 81, and a flowing trough 85 is formed between two of the protruded ribs 84 adjacent to each other. A recessed cavity 810 is provided in an outer end surface 811 of the pole body 81, and a metal inserting pin 812 is inserted into the recessed cavity 810. When the air nipple 9 is inserted into the coupling portion 61 of the outer cover 6, an axial pole 90 of the air nipple 9 will be in contact with the inserting pin 812 to move the valve cock 8, preventing the valve cock 8 from being worn out (see FIG. 10). A spring 52 is sleeved around an outer circumference of the head 82 of the valve cock 8 and is received in the cylindrical chamber 70 of, the base 7 and between the protruded ribs 712 of the cylindrical chamber 70 of the base 7. Two ends of the spring 52 are respectively pressed against the protruded wall 83 and the platforms 710 of the inclined tapering wall 71 to bias the valve cock 8 towards the buffer ring 51 (see FIG. 9). On the other hand, when the air nipple 9 moves the valve cock 8 away from the buffer ring 51, the head 82 of the valve cock 8 can be pressed against the supporting surface 713 of the cylindrical chamber 70 of the base 7.

Figure 9:
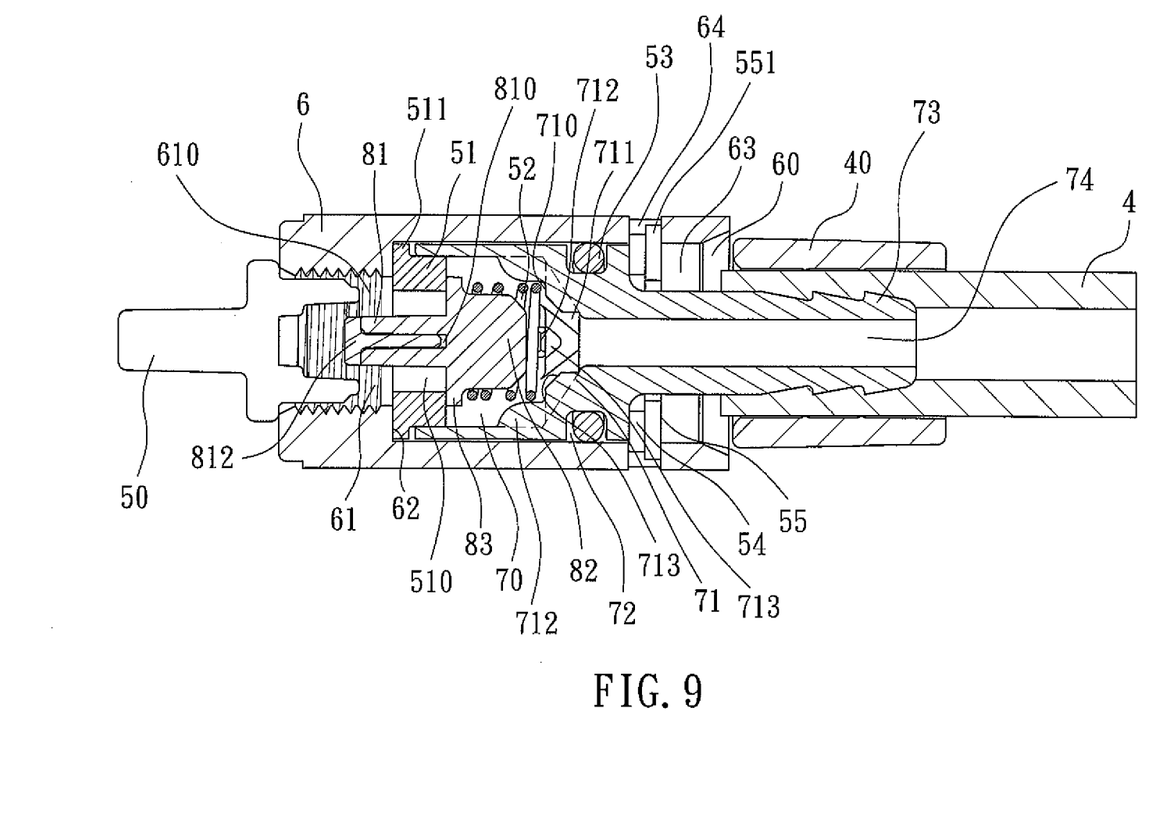
FIG. 9 is a cross-sectional assembly view of the protection adapter and a flexible linking tube of the air compression device of FIG. 1.

After the base 7, the buffer ring 51, the valve cock 8 and the spring 52 are assembled inside the axial hole 63 of the outer cover 6, the protruded wall 83 of the valve cock 8 is pressed against the buffer ring 51 by an elasticity of the spring 52, so that the through-hole 510 of the buffer ring 51 is closed. The pole body 81, the protruded ribs 84, and the flowing trough 85 of the valve cock 8 are disposed inside the through-hole 510 of the buffer ring 51. Further, a retaining ring 54 and a C-shaped clip 55 are sleeved on an outer circumference of the connecting section 73 of the base 7 respectively and are received in the axial hole 63 of the cylindrical outer cover 6, with protruded blocks 541 formed on the retaining ring 54 engaged in the slit openings 64 of the outer cover 6 to fix the base 7 and with protruded portions 551 formed on the C-shaped clip 55 engaged in the slit openings 64 of the outer cover 6 to position the retaining ring 54 inside the outer cover 6. The connecting section 73 of the base 7 is connected with the second end of the flexible linking tube 4, and the flexible linking tube 4 and the protection adapter 5 are fixed by a fixing ring 40. Because an inner diameter of the retaining ring 54 is larger than an outer diameter of the connecting section 73, the outer cover 6 and the valve cock 8 can turn synchronously, and the flexible linking tube 4 will not be coiled when the outer cover 6 is screwed together with the air nipple 9. Furthermore, a stopper 50 is mounted in the coupling portion 61 of the cylindrical outer cover 6.

Figure 10:
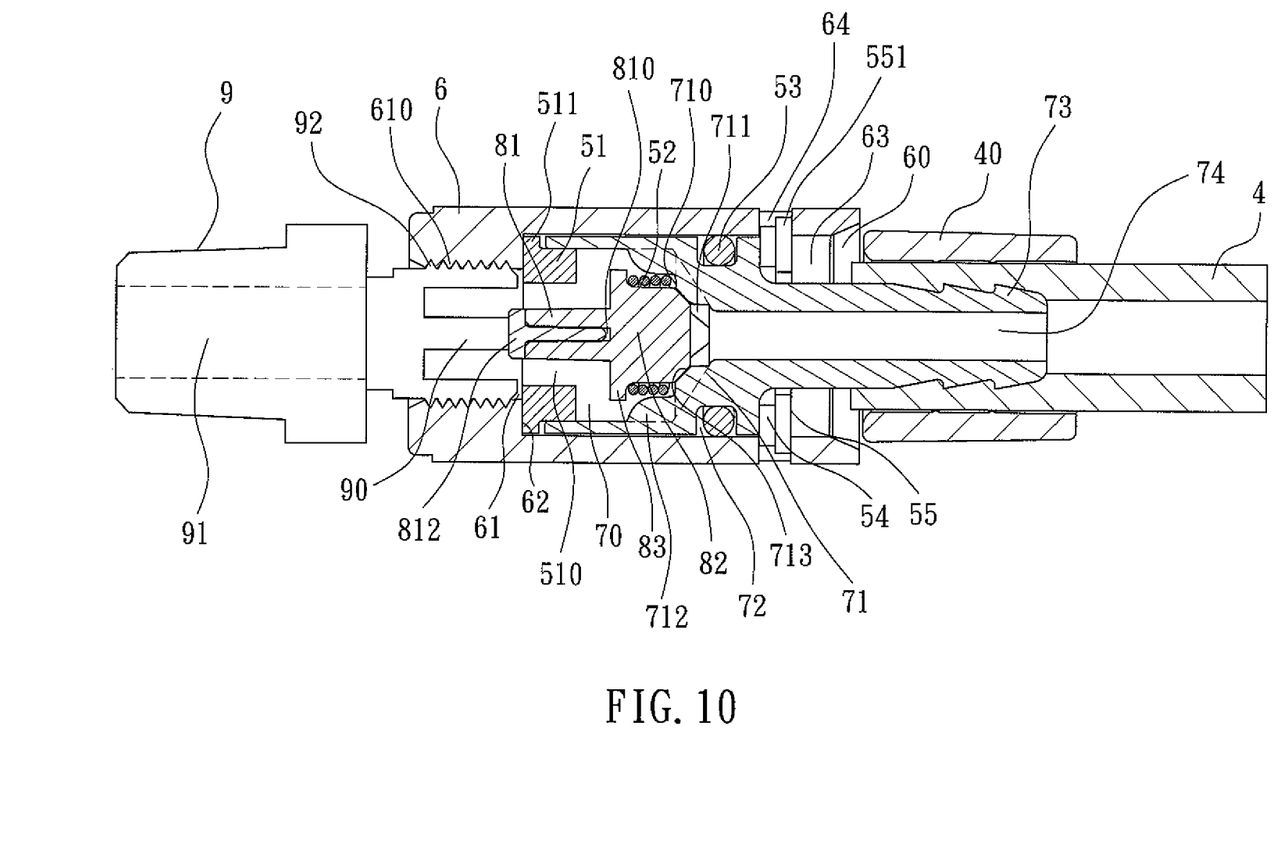
FIG. 10 is a cross-sectional view showing an air nipple of a tire inserted into a coupling portion of the protection adapter of FIG. 9.

When the air compression device of the present invention is applied in tire sealing with adhesive, firstly, the stopper 50 of the protection adapter 5 is removed, and a male thread 92 on the air nipple 9 of the tire 99 is screwed together with the female thread 610 of the coupling portion 61 of the outer cover 6 (referring to. FIG. 10). By having the axial pole 90 of the air nipple 9 in contact with the inserting pin 812 of the valve cock 8, the valve cock 8 is moved away from the buffer ring 51 to compress the spring 52 to open the through-hole 510 of the buffer ring 51. At this point, the liquid adhesive will be pushed by the pressurized air generated by the air compressor 13 and enters into the cylindrical chamber 70 through the passage 74 of the base 7, and, thus, enters into the tire 99 through the flowing trough 711, the flowing trough 85 of the valve cock 8, and a passage 91 of the air nipple 9, and at the same time, the pressurized air enters into the tire 99 to inflate the tire 99. Furthermore, before the air nipple 9 of the tire 99 is inserted into the outer cover 6 to move the valve cock 8, the protruded wall 83 of the valve cock 8 is in close contact with the buffer ring 51, and the through-hole 510 of the buffer ring 51 is closed. Thus, even though the user has the power connected without noticing the switch 11 of the case 1 is turned on, the liquid adhesive in the tire repairing container 2 will not flow out through the flexible linking tube 4. Therefore, the problem of the liquid adhesive shooting out suddenly because of improper handling can be prevented from happening.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. An air compression device comprising:
a case having an air compressor therein;
a tire repairing container containing a liquid adhesive for sealing an automobile tire, with the tire repairing container including an adhesive outlet coupler and an air inlet coupler connected with the air compressor;
a flexible linking tube including a first end combined with a connector and a second end provided with a protection adapter, with the connector coupled to the adhesive outlet coupler of the tire repairing container, with the protection adapter adapted to be connected with an air nipple of the automobile tire and comprising:
an outer cover having an axial hole extending through the outer cover, with the axial hole including a first end having an opening and a second end having a coupling portion for connecting with the air nipple of the tire, with a shoulder formed on an inner end surface of the coupling portion;
a base including a connecting section and a cylindrical section with a cylindrical chamber therein, with the cylindrical section of the base received in the axial hole of the outer cover from the opening, with the connecting section protruded outside of the opening of the outer cover, with a passage formed in the connecting section and in communication with the cylindrical chamber;
a buffer ring mounted in the cylindrical section of the base and having a through-hole extending through the buffer ring, with a flange formed on an end of the buffer ring and pressed against the shoulder of the outer cover;
a valve cock received in the cylindrical chamber of the base and including a pole body extending through the through-hole of the buffer ring, with the valve cock further including a head extending outwardly from an end of the pole body; and
a spring sleeved around an outer circumference of the head of the valve cock and received in the cylindrical chamber of the base, with the spring biasing the valve cock towards the buffer ring to close the through-hole of the buffer ring,
wherein when the air nipple of the tire is engaged with the coupling portion of the outer cover, the air nipple is in contact with the valve cock and moves the valve cock away from the buffer ring, so that the spring is compressed to open the through-hole of the buffer ring, with a plurality of spaced protruded ribs arranged on a circumference wall of the cylindrical chamber, with an inclined tapering wall formed on a bottom of the cylindrical chamber and including a plurality of platforms, with each of the protruded ribs extended inwardly to one of the plurality of platforms of the inclined tapering wall, with a depressed flowing trough formed between two adjacent platforms of the plurality of platforms, with an arcuate supporting surface formed on an inner side of each platform, and with the head of the valve cock pressed against the supporting surface of the base when the air nipple moves the valve cock away from the buffer ring.

2. The air compression device according to claim 1, with the case including a coupling indentation therein, with the air compressor including an air outlet manifold, with the tire repairing container including a lid covering an opening formed in the tire repairing container, with the air inlet coupler and the adhesive outlet coupler provided on the lid, with the tire repairing container engaged to the coupling indentation of the case with the opening pointing downward, and with the air inlet coupler connected to the air outlet manifold of the air compressor.

3. The air compression device according to claim 2, with a female thread formed on an inner wall of the coupling portion of the outer cover for engaging with a male thread formed on the air nipple of the automobile tire.

4. The air compression device according to claim 1, with an annular groove formed in an outer wall of the cylindrical section of the base, and with a sealing ring disposed in the annular groove.

5. The air compression device according to claim 1, with the flange of the buffer ring located between an outer end face of the cylindrical section and the shoulder of the outer cover, with a protruded wall formed between the pole body and the head of the valve cock, and with the protruded wall of the valve cock in close contact with the buffer ring when the through-hole of the buffer ring is closed.

6. The air compression device according to claim 5, with another plurality of spaced protruded ribs formed circumferentially on the pole body, with a flowing trough formed between two of the other plurality of protruded ribs adjacent to each other, with a recessed cavity provided in an outer end surface of the pole body, with a metal inserting pin inserted into the recessed cavity, and with the air nipple in contact with the inserting pin to move the valve cock when the air nipple is inserted into the coupling portion of the outer cover.

7. The air compression device according to claim 6, with the spring received between the plurality of protruded ribs of the cylindrical chamber of the base, and with two ends of the spring respectively pressed against the protruded wall and the plurality of platforms of the inclined tapering wall to bias the valve cock towards the buffer ring.

8. The air compression device according to claim 6, with two slit openings formed oppositely in the outer cover adjacent to the opening, with a retaining ring and a C-shaped clip sleeved on an outer circumference of the connecting section of the base and received in the axial hole of the outer cover, with the retaining ring including protruded blocks engaged in the slit openings of the outer cover to fix the base, and with the C-shaped clip including protruded portions engaged in the slit openings of the outer cover to position the retaining ring inside the outer cover.

9. The air compression device according to claim 8, with the connecting section of the base connected with the second end of the flexible linking tube, with the flexible linking tube and the protection head fixed by a fixing ring, and with a stopper mounted in the coupling portion of the outer cover.

* * * * *